United States Patent
Fujiwara et al.

(10) Patent No.: US 7,395,734 B2
(45) Date of Patent: Jul. 8, 2008

(54) VEHICLE BRAKE APPARATUS

(75) Inventors: Noboru Fujiwara, Toyota (JP); Takashi Hayashihara, Toyota (JP); Hiroyuki Masumo, Toyota (JP)

(73) Assignee: Toyoda Iron Works Co., Ltd., Toyota-shi, Aichi-ken (JP)

( * ) Notice: Subject to any disclaimer, the term of this patent is extended or adjusted under 35 U.S.C. 154(b) by 24 days.

(21) Appl. No.: 10/826,251

(22) Filed: Apr. 19, 2004

(65) Prior Publication Data

US 2005/0204855 A1    Sep. 22, 2005

(30) Foreign Application Priority Data

Mar. 19, 2004    (JP) ................... 2004/080101

(51) Int. Cl.
    *G05G 1/14*    (2006.01)
(52) U.S. Cl. .......................... 74/516; 74/514
(58) Field of Classification Search ............ 74/512, 74/560, 514, 516, 518
    See application file for complete search history.

(56) References Cited

U.S. PATENT DOCUMENTS

| | | | |
|---|---|---|---|
| 2,287,037 A * | 6/1942 | Jandus ................... 74/516 |
| 3,667,314 A * | 6/1972 | Ritter .................... 74/518 |
| 4,784,442 A * | 11/1988 | Petersen ................. 303/15 |
| 5,416,295 A * | 5/1995 | White et al. ............ 200/86.5 |
| 5,563,355 A * | 10/1996 | Pluta et al. ............. 73/862.625 |
| 5,722,744 A | 3/1998 | Kupfer et al. |
| 5,771,773 A * | 6/1998 | Sakamoto et al. ....... 91/369.2 |
| 6,298,746 B1 * | 10/2001 | Shaw .................... 74/512 |
| 6,309,031 B1 * | 10/2001 | Crombez et al. ........ 303/113.4 |
| 6,367,886 B1 * | 4/2002 | Shaw ..................... 303/3 |
| 2001/0047695 A1 * | 12/2001 | Ichiba .................... 74/512 |
| 2004/0129487 A1 * | 7/2004 | Shabana et al. ......... 180/315 |

FOREIGN PATENT DOCUMENTS

| | | |
|---|---|---|
| DE | 2 220 051 | 11/1973 |
| EP | 0 190 411 | 8/1986 |
| EP | 0 768 224 A1 | 4/1997 |
| JP | 59029550 A * | 2/1984 |
| JP | 4-232154 A | 8/1992 |
| JP | 08-150263 A | 6/1996 |
| JP | 08-295211 | 11/1996 |
| JP | 11-78595 A | 3/1999 |
| JP | 2000-168532 A | 6/2000 |

(Continued)

OTHER PUBLICATIONS

European Search Report dated Aug. 17, 2007.

*Primary Examiner*—Richard Ridley
*Assistant Examiner*—Terence Boes
(74) *Attorney, Agent, or Firm*—Finnegan, Henderson, Farabow, Garrett & Dunner, LLP

(57) ABSTRACT

A vehicle brake apparatus includes (a) a brake operating member operable by a vehicle driver; (b) a variable output mechanism which is disposed between the brake operating member and an output member, for mechanically changing a multiplying ratio of an output force in relation to an operational input force from the brake operating member in accordance with an operating stroke of the brake operating member; and (c) a brake controlling unit which is operated in accordance with the output force applied to the output member, wherein a load sensor for detecting the output force is provided between the variable output mechanism and the output member.

13 Claims, 5 Drawing Sheets

FOREIGN PATENT DOCUMENTS

| | | |
|---|---|---|
| JP | 2001-63554 A | 3/2001 |
| JP | 2001-206205 | 7/2001 |
| JP | 2001-239925 | 9/2001 |
| JP | 2001-247020 A | 9/2001 |
| JP | 2001-253326 | 9/2001 |
| JP | 2001-278021 | 10/2001 |
| JP | 2001-334919 A | 12/2001 |
| JP | 2002-517352 A | 6/2002 |
| JP | 2002-196835 | 7/2002 |
| JP | 2002-308084 A | 10/2002 |
| JP | 2003-127846 A | 5/2003 |
| JP | 2003-252187 | 9/2003 |
| JP | 2003-252188 A | 9/2003 |
| JP | 2003-261015 A | 9/2003 |
| JP | 2003-312457 A | 11/2003 |

\* cited by examiner

VEHICLE BRAKE APPARATUS

This application is based on Japanese Patent Application No. 2004-80101 filed Mar. 19, 2004, the contents of which are incorporated hereinto by reference.

BACKGROUND OF THE INVENTION

1. Field of the Invention

The present invention relates to a vehicle brake apparatus provided with a variable output mechanism for changing a multiplying ratio of an output force in relation to an operational input force in accordance with an operating stroke of a brake operating member.

2. Discussion of Related Art

There has been well known a vehicle brake apparatus comprising (a) a brake operating member which is operated by a vehicle driver, (b) a variable output mechanism which is disposed between the brake operating member and an output member and changes the multiplying ratio of an output force of the output member in relation to an operational input force mechanically in accordance with the operating stroke of the brake operating member, and (c) a brake controlling unit which is operated in accordance with the output force applied to the output member. The apparatus described in the patent document 1 is an example thereof and the brake controlling unit generates a brake force mechanically in accordance with the output force applied to the output member. A good operation feeling to the generated brake force (characteristic of an operational input force to a generated brake force) is obtained due to an existence of the variable output mechanism, and a depressing force input from the brake operating member is detected with a load sensor. Further, the patent document 2 discloses a technology for detecting the depressing force of the operating pedal with the load sensor and controlling the brake controlling unit electrically based on a detected value of the load sensor.

[Patent document 1] JP 2001-206205

[Patent document 2] JP H4-232154

However, if it is intended to generate a brake force equal to a brake force generated mechanically through such means as a master cylinder by controlling the brake controlling unit electrically based on a depressing force (operational input force) detected by a load sensor in the vehicle brake apparatus having the variable output mechanism disclosed in the aforementioned Patent document 1, it is necessary to obtain the output force by accurately calculating the multiplying ratio of the variable output mechanism in accordance with the depressing stroke (operating stroke) and rectify it in consideration of allowances and spaces between parts in the variable output mechanism. Thus, a complicated arithmetic equation or the like needs to be set for each of the vehicle brake apparatuses which are different in the structure of the variable output mechanism, dimensions of respective parts and connecting position, which causes a problem that the apparatus becomes expensive.

The present invention has been achieved with these matters as a background and an object of the invention is to enable the brake force to be controlled easily using a common arithmetic equation or the like regardless of different specifications in the vehicle brake apparatus provided with a variable output mechanism.

SUMMARY OF THE INVENTION

The first aspect of the invention provides a vehicle brake apparatus including (a) a brake operating member operable by a vehicle driver; (b) a variable output mechanism which is disposed between the brake operating member and an output member, for mechanically changing a multiplying ratio of an output force in relation to an operational input force from the brake operating member in accordance with an operating stroke of the brake operating member; and (c) a brake controlling unit which is operated in accordance with the output force applied to the output member, wherein a load sensor for detecting the output force is provided between the variable output mechanism and the output member.

The second aspect of the invention provides the vehicle brake apparatus according to the first aspect of the invention, wherein the variable output mechanism includes (a) an intermediate connecting member which is disposed on a supporting member fixed on a vehicle body such that the intermediate connecting member is pivotable about a second axis perpendicular to a operational plane of the brake operating member; (b) a first lever which is provided integrally with the intermediate connecting member, connected with the brake operating member and pivotable about the second axis together with the intermediate connecting member in accordance with the operating stroke of the brake operating member; and (c) a second lever which is provided integrally with the intermediate connecting member such that the second lever is apart from the first lever in the axial direction of the second axis and is connected with the output member for displacing the output member in accordance with a pivotal movement of the intermediate connecting member.

The third aspect of the invention provides the vehicle brake apparatus according to the first or second aspect of the invention, (a) wherein the brake controlling unit is capable of controlling the brake force electrically, the vehicle brake apparatus further including (b) a reaction force unit for applying a reaction force to the output member; and (c) an electric control unit for controlling the brake force of the brake controlling unit electrically based on the output force value of the load sensor.

The fourth aspect of the invention provides the vehicle brake apparatus according to the third aspect of the invention further including (a) a stroke sensor for detecting the operating stroke of the brake operating member, (b) wherein the electric control unit controls the brake force of the brake controlling unit based on detected values of both the load sensor and the stroke sensor.

The fifth aspect of the invention provides the vehicle brake apparatus according to the fourth aspect of the invention, wherein (a) the brake operating member is disposed on the supporting member fixed on the vehicle body such that the brake operating member is pivotable about the specified first axis, and (b) the stroke sensor is disposed on the supporting member coaxial with the first axis for detecting the amount of pivotal movement of the brake operating member.

In the vehicle brake apparatus of the present invention, the load sensor is provided between the variable output mechanism and the output member for detecting an output force applied to the output member, and thus the detected value reflects a change in the multiplying ratio by the variable output mechanism and corresponds to the brake force which is generated mechanically through a master cylinder. Therefore, for example, by controlling the brake controlling unit based on the detected value, the same comfortable operation feeling as a conventional case where the brake force is generated mechanically can be obtained. Further, because it is not necessary to calculate the multiplying ratio of the variable output mechanism in accordance with the operating stroke or to rectify it in consideration of allowances and spaces between parts, the brake controlling unit can be controlled using a common arithmetic equation although the specification of the variable output mechanism or the like of the vehicle brake apparatus is different and the apparatus can be constructed at a low cost.

According to a second aspect of the invention, the variable output mechanism is constructed of (i) the intermediate connecting member disposed pivotably on the supporting member, (ii) the first lever which is provided integrally with the intermediate connecting member and connected with the brake operating member and (iii) the second lever which is provided integrally with the intermediate connecting member such that the second lever is apart from the first lever and connected with the output member. Consequently, freedom for arranging the variable output mechanism and freedom in setting the variable output characteristic, that is, the characteristic of the output force (brake force) relative to an operational input force are achieved, and the vehicle brake apparatus provides a desired variable output characteristic even in a compact form.

The third aspect of the invention concerns an electric control type brake apparatus for controlling the brake controlling unit by means of an electric control unit, in which a reaction force is applied to the output member by means of the reaction force unit and the load sensor detects an output force generated in accordance with the reaction force. Since the output member is displaced through the variable output mechanism, a variable output force is obtained in accordance with an operational input force to the brake operating member only by using a spring or the like which changes the reaction force linearly in relation to a displacement of the output member. Consequently, the vehicle brake apparatus can be constructed easily at a low cost as compared to a case where the variable output characteristic is applied using the reaction force unit without any variable output mechanism.

Since, according to the fourth aspect of the invention, the stroke sensor for detecting the operating stroke of the brake operating member is provided and then, the brake force of the brake controlling unit is controlled based on detected values of both the stroke sensor and the load sensor. Accordingly a vehicle driver's desire for deceleration is determined more accurately than a case where the brake control is carried out with only any one of the sensors, thereby achieving the brake control following the vehicle driver's intention.

Since, according to the fifth aspect of the invention, the aforementioned stroke sensor is disposed coaxially with the first axis, there is no fear that any excessive load is applied to the stroke sensor, an operating stroke can be accurately detected with an inexpensive, small, single-axis sensor, and thus the vehicle brake apparatus can be constructed in a compact design.

The vehicle brake apparatus of the present invention is preferably applied to an electric control type brake apparatus for controlling the brake controlling unit with an electric control device like the third aspect of the invention. Additionally, this may be applied to a detection of a brake force in a mechanical brake apparatus in which an output force of an output member is transmitted to a master cylinder through a brake booster and hydraulic brake as a brake controlling unit is operated mechanically. The vehicle brake apparatus to which the present invention is applied may have both electric control type and mechanical control type as described in the patent document 2, and may be changed from one type to another type when occasion requires. In this case, the electric control type apparatus according to the present invention provides the substantially equal brake reaction force to that by the mechanical control type, thereby reducing a feeling of disharmony occurred in changing from one type to another type.

The operational pedal is preferably used as the brake operating member. The operational pedal is disposed pivotably about the first axis and pivots about the first axis when a depressing portion (such as a pad) provided at a bottom end is depressed. Furthermore, various brake operating members may be employed, such as a type which is moved linearly and a type which is manually operated. While the present invention is applied to a normal brake apparatus preferably, it may be also applied to a parking brake apparatus.

While an intermediate structure type in which a pair of levers of the second aspect of the invention are joined together with an intermediate connecting member is used preferably as the variable output mechanism, various mechanisms in which the multiplying ratio is mechanically changeable may be adopted, such as a type in which a brake operating member or an output member is joined to a single lever member through an elongated hole or a link, and a type in which the output member is moved along a predetermined cam shape. The first lever of the second aspect of the invention is connected to the brake operating member through, for example, an elongated hole or a link and then the second lever is provided with, for example, a load detecting lever and a load sensor. The load detecting lever is connected to an output member and a force acting between the load detecting lever and the second lever in response to a reaction force (output force) is detected with a load sensor.

Preferably, the load detecting lever is disposed on the second lever such that the load detecting lever is pivotable about a third axis, connected to the output member at an intermediate position of the load detecting lever, and engaged with the second lever through the load sensor at a position apart from the third axis, so that a load obtained by reducing an output force applied to the output member at a predetermined lever ratio acts on the load sensor. Further, it is preferable to provide a stopper for restricting a relative pivotal movement between the second lever and the load detecting lever in order to prevent an excessive load by the operational input force from acting on the load sensor. Such detection of the output force with the load detecting lever and the load sensor can be applied to other variable output mechanism than the intermediate structure type of the second aspect of the invention too.

The hydraulic type brake for generating a brake force hydraulically is preferably used as the brake controlling unit. In mechanical type, the brake force is generated mechanically through a master cylinder and in electric control type, a specified brake force is generated with a hydraulic control device such as a linear solenoid valve. Additionally, it is permissible to adopt other operating unit such as an electric type brake which generates a brake force with an electric motor by pressing a brake pad against a disc rotor or pressing a brake shoe against a rotary drum.

Although preferably the reaction force unit of the third aspect of the invention utilizes a spring for changing a reaction force linearly in relation to a displacement in the output member, such as a compression coil spring, a tension coil spring and air spring, it is permissible to use a damper unit together therewith as required, so that a hysteresis can be obtained, in which the reaction force differs between the operation when the brake operating member is depressed and the operation when it is returned. Although the spring may be provided as a return spring at the same time for returning the brake operating member to its original position, it may be disposed separately from the return spring. It is permissible to apply the reaction force with magnetic force or friction force as well as with the spring or it is also permissible to adopt an electric control type reaction force unit for applying a reaction force electrically.

The aforementioned damper unit applies a reaction force with circulation resistance of fluid circulating in the orifice or the like, and a gas type is preferably used as the fluid in which, for example, a gas such as air is sealed. However, it is permissible to use a type in which liquid such as working oil or other fluid is sealed. The damper unit is preferably provided with a check valve which interrupts the circulation of fluid upon the operation of depressing the brake operating member and allows the circulation of the fluid upon the operation of returning the brake operating member. As a result, a large circulation resistance is generated with the aforementioned orifice and a large reaction force (output force) is generated in accordance with the operating speed upon the brake operation, and the circulation resistance is lowered and the brake operating member is returned to its original position quickly with a spring or the like upon the operation of returning.

While, according to the fourth aspect of the invention, a stroke sensor is provided as well as the load sensor and the brake controlling unit is controlled based on the detected values of the both sensors, the brake may be controlled based on only the detected value of the load sensor. While the stroke sensor is disposed to detect the operating stroke of the brake operating member directly, other stroke sensors may be disposed, which detect a traveling stroke of the variable output mechanism or output member displacing in accordance with the operating stroke of the brake operating member. For example, if the variable output mechanism is constructed as stated in the second aspect of the invention, the same effect as the fifth aspect of the invention may be achieved by disposing the stroke sensor coaxially with the second axis to detect the amount of pivotal movement of at least one of the first lever, second lever and intermediate connecting member.

DETAILED DESCRIPTION OF THE PREFERRED EMBODIMENTS

Hereinafter, the embodiment of the present invention will be described in detail with reference to the accompanying drawings.

FIG. 1 is a diagram showing an electric control type vehicle brake apparatus 10 according to an embodiment of the present invention. FIG. 1($a$) is a left side view of FIG. 1($b$), FIG. 1($b$) is a front view and FIG. 1($c$) is a right side view of the FIG. 1($b$). This vehicle brake apparatus 10 is used as a service brake and a bracket 12 fixed to the vehicle body is provided with a supporting shaft 14 substantially horizontally and an operating pedal 16 is disposed such that it is pivotable about a first axis $O_1$ which is an axis of the supporting shaft 14. A depressing portion 18 is provided at a bottom end of the operating pedal 16 and when it is depressed forward of the vehicle (leftward in FIG. 1($a$)) by a vehicle driver, the operating pedal 16 is pivoted clockwise about the first axis $O_1$ so that the depressing force (depression operating force) is transmitted to an output member 22 through a variable output mechanism 20. The output member 22 is provided with a reaction force unit 30 as shown in FIG. 2 to apply an operational resistance (reaction force) to the operating pedal 16. The bracket 12 corresponds to the supporting member and the operating pedal 16 corresponds to the brake operating member.

The variable output mechanism 20 multiplies the depressing force (operational input force) on the operating pedal 16 by a predetermined multiplying ratio and transmits the multiplied force to the output member 22. At the same time, the variable output mechanism 20 changes the multiplying ratio mechanically and continuously in accordance with a depressing stroke (operating stroke) of the operating pedal 16, and comprises an intermediate connecting member 32 disposed on the bracket 12 such that the intermediate connecting member 32 is pivotable about a second axis $O_2$ perpendicular to the pivoting plane of the operating pedal 16 (that is, in parallel to the first axis $O_1$), and a pair of a first lever 34 and a second lever 36 fixed integrally on the intermediate connecting member 32. The intermediate connecting member 32 is formed into a cylindrical shape and disposed rearward of the operating pedal 16 (in a forward direction of the vehicle). The first lever 34 and the second lever 36 are disposed along the second axis $O_2$ or in the width direction of the vehicle such that they are apart from each other in the right and left direction of FIG. 1($b$).

The first lever 34 is disposed at substantially the same position as the operating pedal 16 in the width direction of the vehicle, that is, in the right and left direction in FIG. 1($b$) and extended obliquely upward so as to approach the top end portion of the operating pedal 16. The first lever 34 is connected within an intermediate position of the operating pedal 16, that is, a portion between the supporting shaft 14 and the depressing portion 18, through the joint link 38. Consequently, in accordance with the depressing operation of the operating pedal 16, the first lever 34 is pivoted counterclockwise about the second axis $O_2$ in FIG. 1($a$) integrally with the intermediate connecting member 32 and the second lever 36, and then in accordance with the pivotal movement of the second lever 36, the output member 22 is displaced to the left direction in FIG. 1($a$) and a load (output force) is generated by the reaction force unit 30. In this case, the multiplying ratio of the output force of the output member 22 to the depressing force of the operating pedal 16 is changed continuously in accordance with the depressing stroke of the operating pedal 16 depending on the lever lengths of the first lever 34 and the second lever 36 and the connecting positions of a joint link 38 and the output member 22. The solid line in FIG. 2 indicates the condition in which the operating pedal 16 is depressed and the dotted and dashed line indicates the condition in which the operating pedal is maintained at an original position like FIG. 1.

The second lever 36 is disposed at a position deflected to the left side of the operating pedal 16 in the width direction of the vehicle, that is, in the right and left direction in FIG. 1($b$) and extended obliquely upward to the operating pedal 16 substantially in parallel to the first lever 34. The second lever 36 is longer than the first lever 34 while a front end portion thereof intersects the operating pedal 16 in a side view of FIG. 1($a$). A load sensor 40 is disposed at a top end portion thereof and a load (output force) is transmitted from the second lever 36 through the load sensor 40 to a load detecting lever 42 and further to the output member 22. Then, a transmitted load or an output force is detected by the load sensor 40. The load detecting lever 42 is disposed on the second lever 36 such that the load detecting lever 42 is pivotable about a third axis $O_3$ which is an axis of a mounting pin 44 through the mounting pin 44 parallel to the second axis $O_2$ as shown in FIG. 3 in an enlarged manner and a contact pin 46 is fixed at a position opposing to the load sensor 40. An output lever 48, which is enough shorter than the load detecting lever 42, is fixed integrally on the mounting pin 44 on an opposite side (this side of the paper in FIG. 3) to the load detecting lever 42 with nipping the second lever 36 and the output member 22 is relatively pivotably connected with the output lever 48 through a connecting pin 50. Consequently, a load reduced in accordance with a lever ratio of the load detecting lever 42 to the output lever 48 compared with the output force transmitted to the output member 22, is detected by the load sensor 40.

The load sensor 40 contains a sensor portion which is elastically deformed in accordance with a load applied from the contact pin 46 and the elastic deformation of the sensor portion is converted to an electric signal with a strain gauge or the like and outputted. The second lever 36 contains a through hole 52 which allows the connecting pin 50 to pass through with a predetermined allowance so that the load detecting lever 42 and the output lever 48 are relatively pivotable in relation to the second lever 36 in accordance with the elastic deformation. The connecting pin 50 goes through the through hole 52 and is fixed together with the output lever 48 and the load detecting lever 42. A tension coil spring 54 is stretched between the load detecting lever 42 and the second lever 36 to bias them for contacting the contact pin 46 with the load sensor 40. FIGS. 3(a) and 3(b) show the state that the operating pedal 16 is depressed. Usually, there is an allowance between the connecting pin 50 and the through hole 52 as shown in FIG. 3(a) and a transmitted load (output force) is detected by the load sensor 40. If an excessive depressing force is applied to the operating pedal 16, as shown in FIG. 3(b), the connecting pin 50 makes a contact with the wall face of the through hole 52, thereby preventing the load detecting lever 42 and the second lever 36 from pivoting further relatively in order to protect the load sensor 40 from an excessive load. The through hole 52 and the connecting pin 50 function as a stopper for restricting a relative pivotal movement between the load detecting lever 42 and the second lever 36 to protect the load sensor 40 from such an excessive load.

The reaction force unit 30 includes a compression coil spring 26 and a damper unit 28 disposed coaxially in parallel to each other between the output member 22 and the vehicle body 24 as shown in FIG. 2. Although the compression coil spring 26 only changes a reaction force linearly, that is, an output force detected by the load sensor 40 linearly in relation to a displacement of the output member 22, the output member 22 is displaced non-linearly in accordance with the depressing stroke of the operating pedal 16 through the variable output mechanism 20. Thus, an output force detected by the load sensor 40 changes non-linearly in accordance with the depressing force of the operating pedal 16 to produce a variable output force whose multiplying ratio changes continuously.

The damper unit 28 is an air type one which is compressed mechanically in accordance with the depressing operation of the operating pedal 16 to apply a depressing reaction force to the operating pedal 16 based on air circulation resistance. While the bottom portion of the cylinder is fixed integrally to the vehicle body 24, the piston rod 29 on an opposite side of the bottom portion is connected with the output member 22, so that the piston rod 29 is depressed into the cylinder in accordance with the depressing operation of the operating pedal 16. A piston (not shown) of the damper unit 28 is provided with an orifice and a check valve and when the operating pedal 16 is depressed to force the piston rod 29 into the damper unit 28, air is circulated through the orifice such that a large circulation resistance is generated and consequently the depressing reaction force of the operating pedal 16 is increased. However, since air is circulated through the check valve when the operating pedal 16 is returned, the operating pedal 16 is quickly returned to its original position by a biasing force of the compression coil spring 26. The compression coil spring 26 also serves as a return spring.

The bracket 12 is provided with a stroke sensor 56 for detecting the depressing stroke of the operating pedal 16, that is, the amount of pivotal movement of the operating pedal 16 about the first axis $O_1$. The stroke sensor 56 is disposed coaxially with the first axis $O_1$ as shown in FIG. 4 and includes a detecting lever 58 which is pivoted about the first axis $O_1$ and detects the amount of pivotal movement of the operating pedal 16. On the other hand, the operating pedal 16 is provided integrally with an engaging lever 60 which engages with the detecting lever 58 and when the detecting lever 58 is pivoted about the first axis $O_1$ in accordance with the depressing operation of the operating pedal 16, the depressing stroke of the operating pedal 16 is detected.

On the other hand, as shown in FIG. 5, the vehicle brake apparatus 10 of this embodiment comprises a brake control unit 62 constructed to be provided with a microcomputer or the like and a brake controlling unit 64 by which a brake force is electrically controllable. The brake force is controlled based on detected values of both the load sensor 40 and the stroke sensor 56. For example, a hydraulic brake for generating a brake force by hydraulic pressure is employed as the brake controlling unit 64 and a hydraulic force, that is, a brake force is controlled electrically by a hydraulic control unit such as a linear solenoid valve.

The brake control unit 62 corresponds to an electric control unit for controlling the brake force of the brake controlling unit 64 electrically and determines a deceleration request from a vehicle driver based on detected values from both the load sensor 40 and the stroke sensor 56 so as to control the brake force of the brake controlling unit 64 in accordance with the deceleration request. That is, the brake control includes normal braking control for controlling the brake force in accordance with the detected value of the load sensor 40 or the stroke sensor 56 and rapid braking control for controlling a brake force when the detected value is over a specified value. The load sensor 40 detects an output force (corresponding to the depressing force) and a change of the output force and the stroke sensor 56 detects a depressing stroke and an operating speed. In this case, since the difference is small between the operating speed of the operating pedal 16 during a driving on a downward slope of a mountain road and that in a rapid braking, it is difficult to distinguish the operation of the downward driving braking from that of the rapid braking. However, since the depressing stroke and output force in the downward driving braking are smaller than those in the rapid braking, the operation in the downward driving braking can be distinguished from the operation in the rapid braking by comprehensive determining with taking the depressing stroke, the output force and others into consideration. Consequently, the brake force can be controlled appropriately in accordance with the detected values of the load sensor 40 and the stroke sensor 56.

There may be various cases in brake operations. For example, one case involves a high operating speed of the operating pedal 16, a high output force (depressing force) and a not-so-large depressing stroke, and an other case involves a not-so-high output force and a large depressing stroke. In these cases, it is difficult to determine with only the stroke sensor 56 whether the driver intends to stop or to decelerate the vehicle, and a brake force control according to the driver's intention cannot be achieved. However, taking both the detected values of the load sensor 40 (output force) and the depressing stroke into consideration, the brake force can be controlled highly reflecting the driver's intention.

In the vehicle brake apparatus 10 of this embodiment, the load sensor 40 is provided between the variable output mechanism 20 and the output member 22 for detecting an output force applied to the output member 22. Thus, the detected value reflects a change of the multiplying ratio by the variable output mechanism 20, and corresponds to a brake force when the brake force is generated mechanically through the master cylinder. Since the brake controlling unit 64 is controlled based on a detected value of the load sensor 40, the same comfortable operation feeling can be obtained as the conventional one which generates the brake force mechanically. Further, it is not necessary to accurately calculate the multiplying ratio of the variable output mechanism in accordance with the depressing stroke or to rectify it in consideration of allowances and spaces between parts, and therefore the brake controlling unit can be controlled based on a common arithmetic equation or the like for a vehicle brake apparatus whose specification about the structure of the variable output mechanism 20, the dimension of each part, its connecting position and the like are different, and consequently the inexpensive brake controlling units are provided.

The variable output mechanism 20 is constructed of the intermediate connecting member 32 disposed pivotably on the bracket 12, the first lever 34 which is provided integrally with the intermediate connecting member 32 and connected with the operating pedal 16 through the joint link 38, and the second lever 36 which is provided integrally with the intermediate connecting member 32 such that the second lever 36 is apart from the first lever 34 in the direction of the second axis $O_2$ and connected with the output member 22 through the output lever 48. Consequently, higher degree of freedom in arranging the variable output mechanism 20 and setting the variable output characteristic, that is characteristic of the output (corresponding to the brake force) relative to the depressing force are achieved, and the vehicle brake apparatus 10 provides a desired variable output characteristic even in a compact form. According to this embodiment, as shown in a side view of FIG. 1(a), since the second lever 36 is disposed to intersect the operating pedal 16, the apparatus can be constructed in a compact form by reducing the dimension in the fore and aft direction of the vehicle as compared to the apparatus described in the above-mentioned patent document 1.

According to this embodiment, a reaction force is applied to the output member 22 by the reaction force unit 30 and an output force generated in accordance with the reaction force is detected by the load sensor 40. Since the output member 22 is displaced through the variable output mechanism 20, the reaction force unit 30 generates a variable output force relative to the depressing force of the operating pedal 16 by using a spring only or the like for changing the reaction force linearly to a displacement of the output member 22. Consequently, the vehicle brake apparatus 10 can be constructed easily at a low cost as compared to a case where the variable output characteristic is given by the reaction force unit 30 without using the variable output mechanism 20. That is, if the variable output characteristic is given by the reaction force unit 30, anon-linear characteristic can be obtained using plural springs. However, it is not always easy to obtain the same variable output characteristic as in the variable output mechanism 22 because, for example, many springs are required.

According to this embodiment, the stroke sensor 56 is provided as well as the load sensor 40 in order to detect a depressing stroke (amount of pivotal movement) of the operating pedal 16 and at the same time, the brake force of the brake controlling unit 64 is controlled based on both detected values of the load sensor 40 and the stroke sensor 56. Thus, the brake control can be executed following a vehicle driver's intention by more accurately determining the vehicle driver's desire for deceleration as compared to a case where the brake control is carried out with only any one of these sensors.

Since the aforementioned stroke sensor 56 is disposed coaxially with the first axis $O_1$ which is a pivotal center of the operating pedal 16 whose pivotal movement amount should be detected, there is no fear that any excessive load is applied to the stroke sensor 56 and the depressing stroke can be accurately detected by using an inexpensive and small single-axis sensor and further, the apparatus with a compact form is provided.

The embodiment of the present invention has been described based on the drawings above. This is a mere embodiment of the invention and may be modified or improved based on knowledge of those skilled in art.

BRIEF DESCRIPTION OF THE DRAWINGS

FIG. 1 is a diagram showing the vehicle brake apparatus according to an embodiment of the present invention and FIG. 1(a) is a left side view of FIG. 1(b)

Figure 1C:
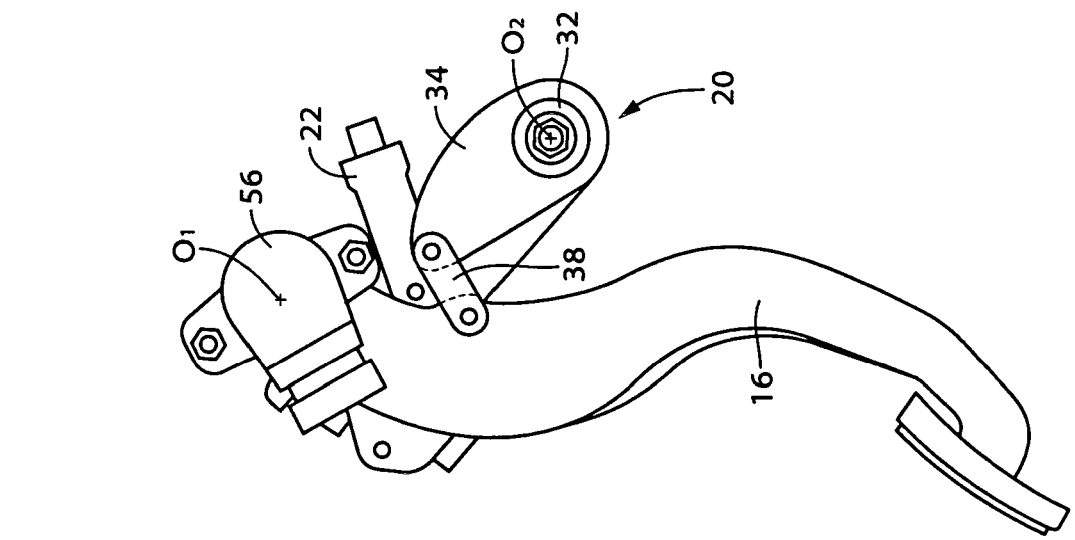
FIG. 1(b) is a front view and FIG. 1(c) is a right side view of FIG. 1(b).
Figure 1B:
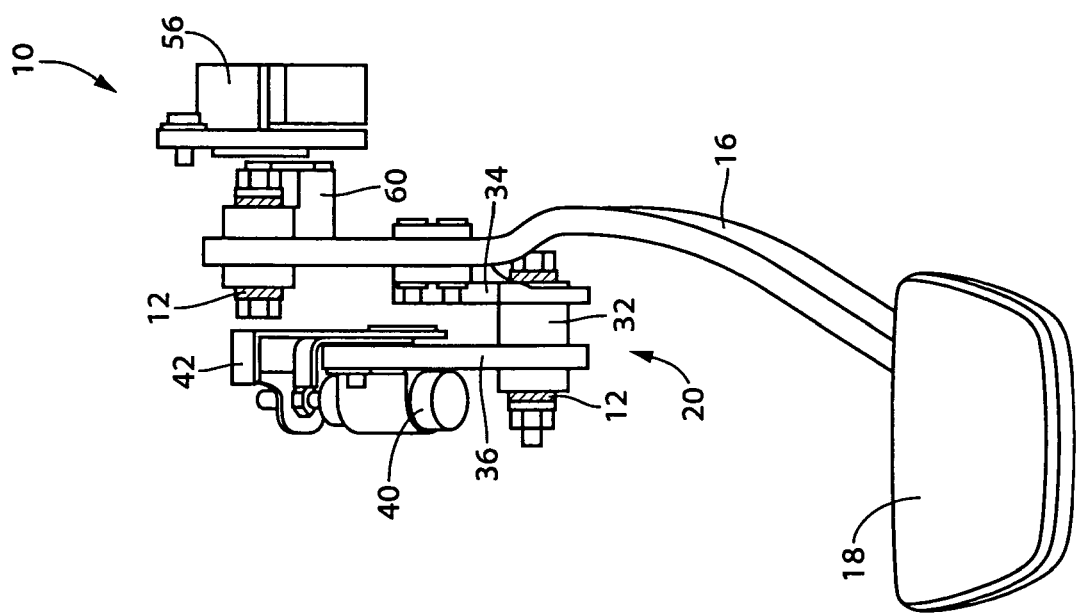
Figure 1A:
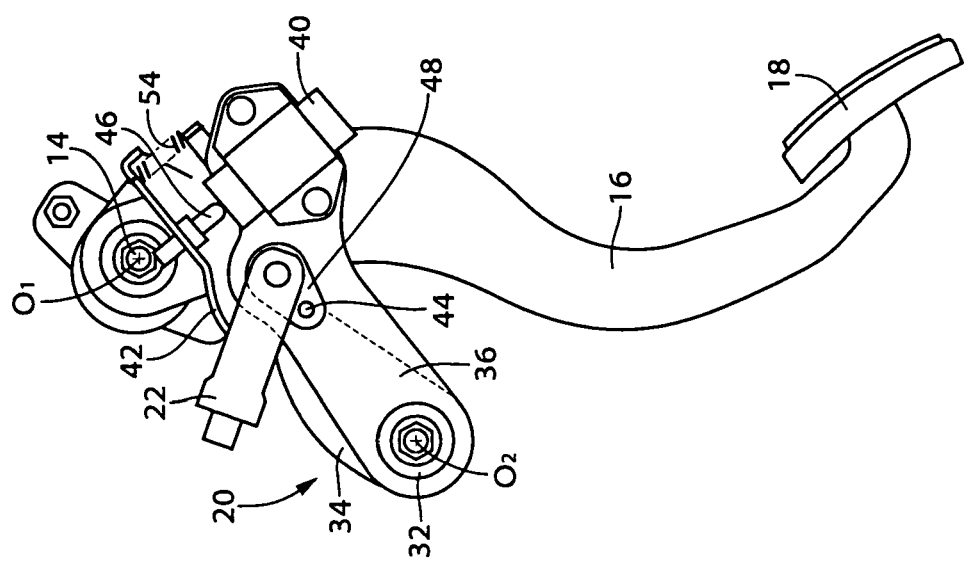
Figure 2:
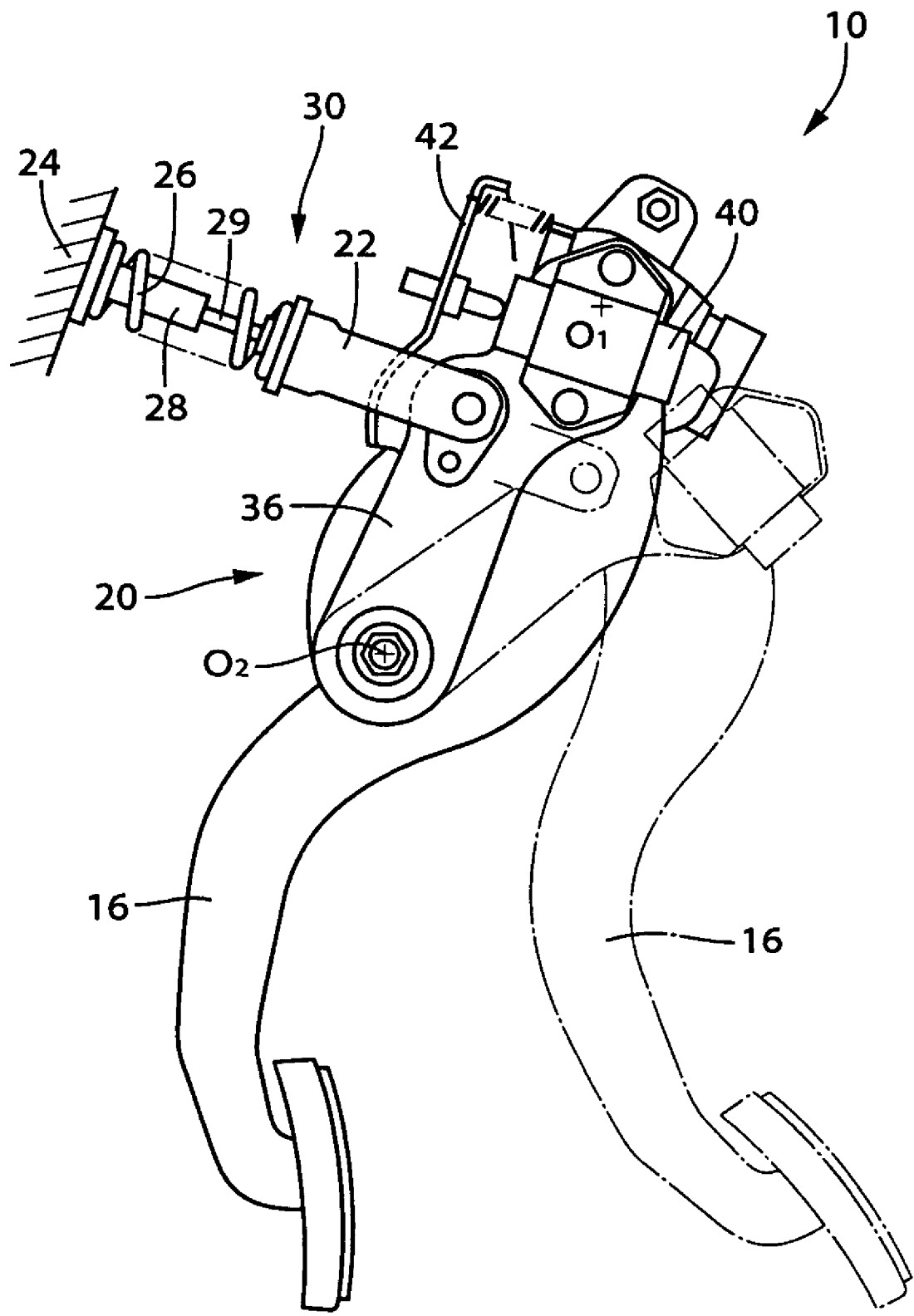
FIG. 2 is a left side view showing a condition in which the vehicle brake apparatus of FIG. 1 is depressed.
Figure 3A:
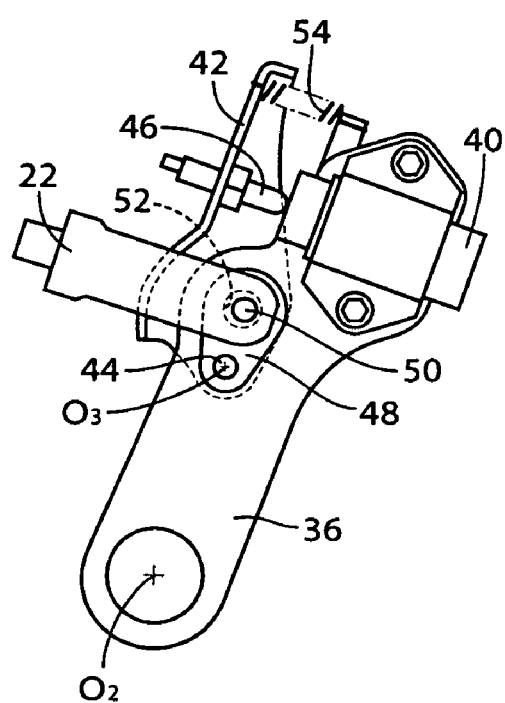
FIG. 3 is an explanatory diagram for explaining the load sensor disposed between the variable output mechanism and the output member in the vehicle brake apparatus, FIG. 3(a) indicates a state in which the normal brake operation is carried out and FIG. 3(b) indicates a state in which a detection limit is reached by an excessive brake operation.
Figure 3B:
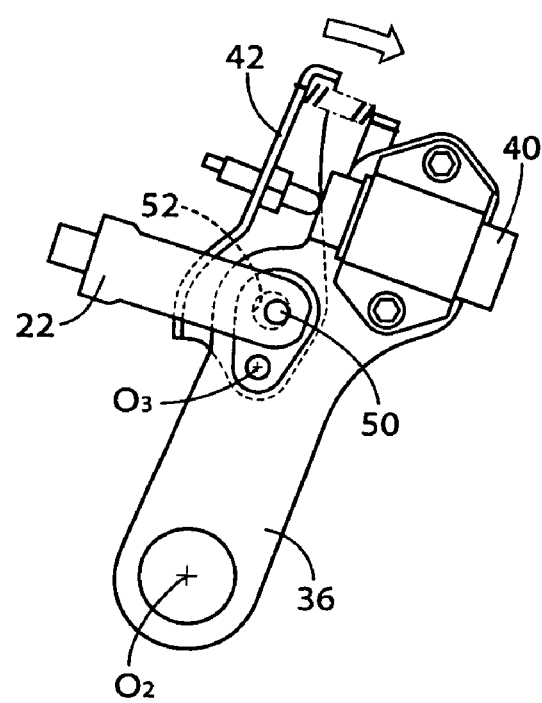
Figure 4:
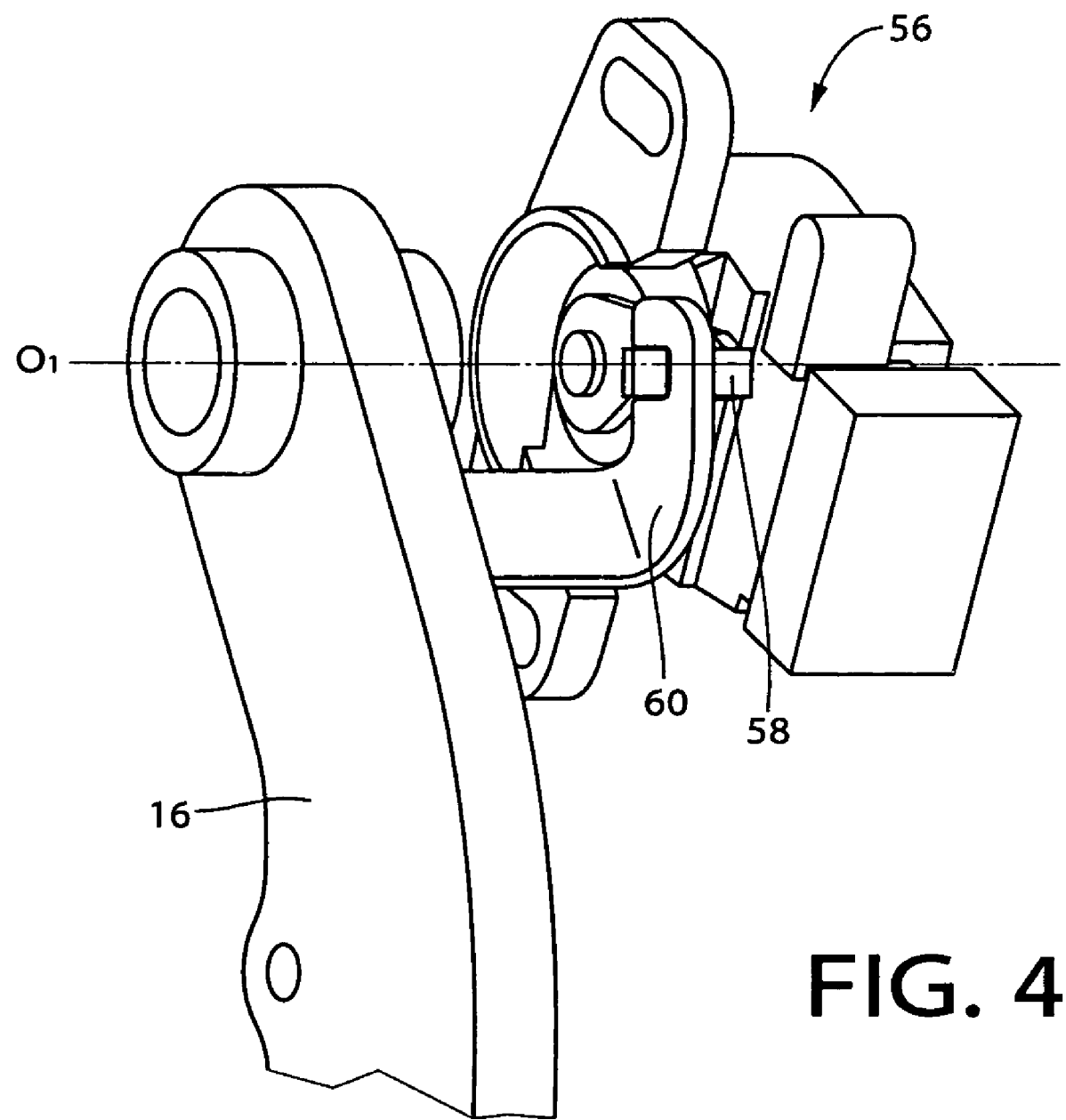
FIG. 4 is a perspective view showing the stroke sensor provided in the vehicle brake apparatus.
Figure 5:
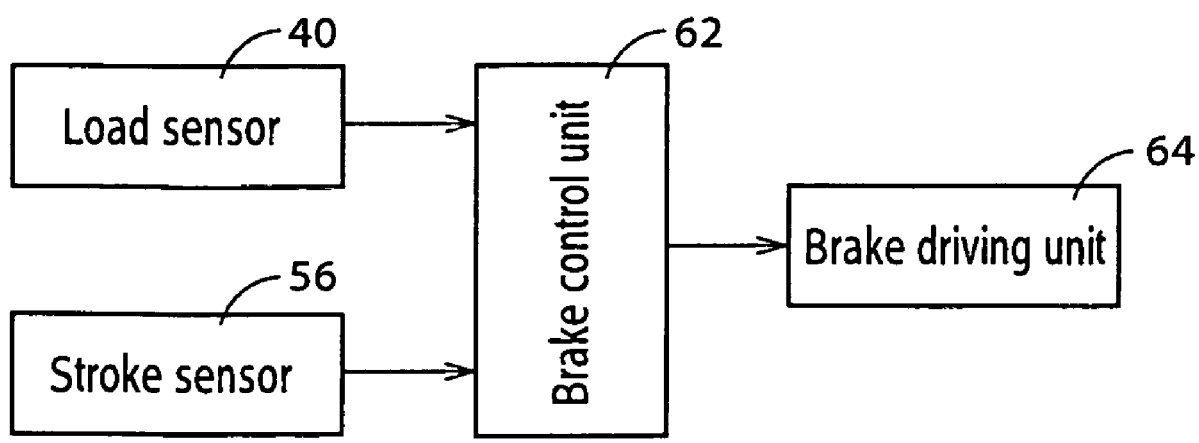
FIG. 5 is a block diagram relating to the control system of the vehicle brake apparatus.

What is claimed is:

1. A vehicle brake apparatus comprising:

a brake operating member operable by a vehicle driver;

a variable output mechanism which is disposed between the brake operating member and an output member, in which a multiplying ratio of an output force is changed mechanically and non-linearly in relation to an operational input force from the brake operating member in accordance with an operating stroke of the brake operating member;

a brake controlling unit which is operated in accordance with the output force applied to the output member, a load sensor for detecting the output force provided between the variable output mechanism and the output member;

a reaction force unit including a single spring disposed between the output member and a vehicle body side member applying a reaction force to the output member by biasing the output member; and a damper unit applying a hysteresis differing between operation of the brake member and return of the brake operating member wherein the variable output mechanism comprises:

an intermediate connecting member which is disposed on a supporting member fixed on a vehicle body such that the intermediate connecting member is pivotable about a second axis perpendicular to a operational plane of the brake operating member;

a first lever which is provided integrally with the intermediate connecting member, connected with the brake operating member and pivotable about the second axis together with the intermediate connecting member in accordance with the operating stroke of the brake operating member; and a second lever which is provided integrally with the intermediate connecting member such that the second lever is apart from the first lever in the axial direction of the second axis and is connected with the output member for displacing the output member in accordance with a pivotal movement of the intermediate connecting member;

wherein a load detecting lever pivotable about a third axis, and an output lever being pivotable about the third axis integral with the load detecting lever and having a length smaller than a length of the load detecting lever are attached to the second lever, and the load senser is attached between the second lever and the load detecting lever.

2. The vehicle brake apparatus according to claim 1, wherein the brake controlling unit is capable of controlling the brake force electrically, the vehicle brake apparatus further comprising:

an electric control unit for controlling the brake force of the brake controlling unit electrically based on the output force value of the load sensor.

3. The vehicle brake apparatus according to claim 2 further comprising a stroke sensor for detecting the operating stroke of the brake operating member, wherein the electric control unit controls the brake force of the brake controlling unit based on detected values of both the load sensor and the stroke sensor.

4. The vehicle brake apparatus according to claim 3, wherein the brake operating member is disposed on the supporting member fixed on the vehicle body such that the brake operating member is pivotable about a specified first axis, and the stroke sensor is disposed on the supporting member coaxial with the first axis for detecting the amount of pivotal movement of the brake operating member.

5. The vehicle brake apparatus according to claim 1, wherein the spring outputs a linear reaction force.

6. The vehicle brake apparatus according to claim 5, wherein the brake controlling unit is capable of controlling the brake force electrically, and wherein the vehicle brake apparatus further comprises an electric control unit for controlling the brake force of the brake controlling unit electrically based on the output value of the load sensor.

7. The vehicle brake apparatus according to claim 6, further comprising a stroke sensor for detecting the operating stroke of the brake operating member, and wherein the electric control unit controls the brake force of the brake controlling unit based on detected values of both the load sensor and the stroke sensor.

8. The vehicle brake apparatus according to claim 7, wherein the brake operating member is disposed on the supporting member fixed on the vehicle body such that the brake operating member is pivotable about a specified first axis, and wherein the stroke sensor is disposed on the supporting member coaxial with the first axis for detecting the amount of rotation of the brake operating member.

9. The vehicle brake apparatus according to claim 5, wherein the brake controlling unit is capable of controlling the brake force electrically, the vehicle brake apparatus further comprising an electric control unit for controlling the brake force of the brake controlling unit electrically based on the output value of the load sensor.

10. The vehicle brake apparatus according to claim 9, further comprising a stroke sensor for detecting the operating stroke of the brake operating member, wherein the electric control unit controls the brake force of the brake controlling unit based on detected values of both the load sensor and the stroke sensor.

11. The vehicle brake apparatus according to claim 10, wherein the brake operating member is disposed on the supporting member fixed on the vehicle body such that the brake operating member is pivotable about a specified first axis, and wherein the stroke sensor is disposed on the supporting member coaxial with the first axis for detecting the amount of rotation of the brake operating member.

12. A vehicle brake apparatus according to claim 1, wherein the single spring includes a first end attached to the output member, and a second end attached to a vehicle body.

13. A vehicle brake apparatus according to claim 1, wherein the load sensor transmits the detected output of the variable output mechanism to the brake controlling unit.

* * * * *